UNITED STATES PATENT OFFICE.

ERWIN HOFFA, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

VIOLET-BLUE VAT DYESTUFFS.

1,025,138.     Specification of Letters Patent.     Patented May 7, 1912.

No Drawing.     Application filed October 26, 1910. Serial No. 589,160.

*To all whom it may concern:*

Be it known that I, ERWIN HOFFA, Ph. D., chemist, a citizen of the Empire of Germany, residing at Höchst-on-the-Main, Germany, have invented certain new and useful Improvements in Violet-Blue Vat Dyestuffs, of which the following is a specification.

I have found that violet-blue vat dyestuffs of the following constitution can be obtained:

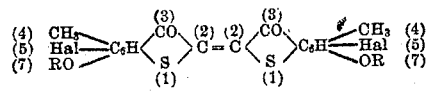

wherein R stands for an alkyl group, Hal for a halogen, namely chlorin or bromin. These coloring matters are obtained by the known processes, for instance from the thioglycollic acid of the constitution:

$C_6[S.CH_2COOH(1):H(2):CH_3(3):Hal(4)H(5):OR(6)]$ by the action of chlorosulfonic acid. The same coloring matters can also be produced by oxidizing the corresponding substituted oxy-thionaphthenes obtainable according to the methods used in the thioindigo series. It is surprising that these dyestuffs dye in the vat violet-blue tints, because the isomeric dyestuffs:

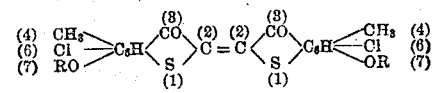

wherein the chlorin is in 6 position, dye bluish-red tints.

The following example illustrates my invention: One part of thioglycollic acid of the constitution:

$C_6[S.CH_2COOH(1):H(2):CH_3(3):Cl(4)H(5)OCH_3(6)]$ is introduced at about 15° C. into 5 parts of chlorosulfonic acid, and the mixture is stirred until the formation of the dyestuff is completed. The mass is then poured on ice, the separated dyestuff filtered off, and for further purifying it is treated with boiling caustic soda lye.

The dyestuff forms a violet-blue powder which is insoluble in water, almost insoluble in alcohol to a violet solution, soluble in hot nitrobenzene to a violet, and in concentrated sulfuric acid to a green solution. On adding a solution of alkaline hydrosulfite it gives a yellow vat, which dyes cotton and wool violet-blue, fast tints.

If instead of the above-mentioned methoxylated thioglycollic acid the corresponding ethoxylated acid is used, a very similar dyestuff is obtained. The corresponding bromin-substituted dyestuff also very much resembles the above described dyestuff.

Having now described my invention what I claim is:

1. As new products, the bluish-violet vat dyestuffs of the constitution:

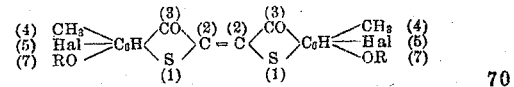

wherein "Hal" means a halogen and "R" an alkyl, being a violet-blue powder, insoluble in water, almost insoluble in alcohol, soluble in nitrobenzene to a violet solution, in concentrated sulfuric acid to a green solution, yielding on addition of a solution of alkaline hydrosulfite a yellow vat which dyes cotton and wool violet-blue tints.

2. As a new product, a bluish-violet vat dyestuff of the constitution:

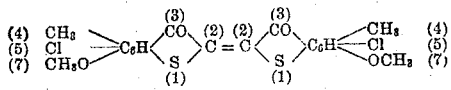

being a violet-blue powder, insoluble in water, almost insoluble in alcohol, soluble in nitrobenzene to a violet solution, in concentrated sulfuric acid to a green solution, yielding on addition of a solution of alkaline hydrosulfite a yellow vat which dyes cotton and wool violet-blue tints.

In testimony whereof, I affix my signature in presence of two witnesses.

ERWIN HOFFA.

Witnesses:
JEAN GRUND,
CARL GRUND.